United States Patent
Park et al.

(10) Patent No.: US 10,657,958 B2
(45) Date of Patent: May 19, 2020

(54) ONLINE TARGET-SPEECH EXTRACTION METHOD FOR ROBUST AUTOMATIC SPEECH RECOGNITION

(71) Applicant: SOGANG UNIVERSITY RESEARCH FOUNDATION, Seoul (KR)

(72) Inventors: Hyung-Min Park, Seoul (KR); Minook Kim, Goyang-si (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 0 days.

(21) Appl. No.: 16/181,798

(22) Filed: Nov. 6, 2018

(65) Prior Publication Data

US 2019/0074000 A1 Mar. 7, 2019

Related U.S. Application Data

(63) Continuation-in-part of application No. 15/071,594, filed on Mar. 16, 2016, now abandoned.

(30) Foreign Application Priority Data

Mar. 18, 2015 (KR) .................. 10-2015-0037314

(51) Int. Cl.
*G10L 15/20* (2006.01)
*G10L 25/84* (2013.01)
(Continued)

(52) U.S. Cl.
CPC .............. *G10L 15/20* (2013.01); *G10L 15/22* (2013.01); *G10L 21/0216* (2013.01);
(Continued)

(58) Field of Classification Search
CPC ...................................................... G10L 15/20
USPC ........................................................ 704/227
See application file for complete search history.

(56) References Cited

U.S. PATENT DOCUMENTS

2005/0203981 A1* 9/2005 Sawada ..................... G01S 3/46
708/322
2006/0015331 A1* 1/2006 Hui ..................... G10L 21/0272
704/227
(Continued)

FOREIGN PATENT DOCUMENTS

JP 2008219458 9/2008
KR 20030078218 10/2003
(Continued)

OTHER PUBLICATIONS

K. Matsuoka, Minimal distortion principle for blind source separation Aug. 5-7, 2002, SICE, pp. 2138-2143.*

*Primary Examiner* — Paras D Shah
*Assistant Examiner* — Timothy Nguyen
(74) *Attorney, Agent, or Firm* — Cantor Colburn LLP

(57) ABSTRACT

Provided is a target speech signal extraction method for robust speech recognition including: (a) receiving information on a direction of arrival of the target speech source with respect to the microphones; (b) generating a nullformer by using the information on the direction of arrival of the target speech source to remove the target speech signal from the input signals and to estimate noise; (c) setting a real output of the target speech source using an adaptive vector w(k) as a first channel and setting a dummy output by the nullformer as a remaining channel; (d) setting a cost function for minimizing dependency between the real output of the target speech source and the dummy output using the nullformer by performing independent component analysis (ICA); and (e) estimating the target speech signal by using the cost function, thereby extracting the target speech signal from the input signals.

8 Claims, 12 Drawing Sheets

(51) Int. Cl.
  *G10L 15/22* (2006.01)
  *G10L 21/0216* (2013.01)
  *H04R 3/00* (2006.01)
  *H04R 1/40* (2006.01)
  *G10L 15/00* (2013.01)

(52) U.S. Cl.
  CPC ............... *G10L 25/84* (2013.01); *H04R 1/406* (2013.01); *H04R 3/005* (2013.01); *G10L 15/00* (2013.01); *G10L 2021/02166* (2013.01); *H04R 2430/03* (2013.01)

(56) References Cited

U.S. PATENT DOCUMENTS

| | | | |
|---|---|---|---|
| 2009/0055170 A1* | 2/2009 | Nagahama | G10L 15/20 704/226 |
| 2009/0150146 A1* | 6/2009 | Cho | G10L 15/20 704/233 |
| 2009/0222262 A1* | 9/2009 | Kim | G10L 21/0272 704/231 |
| 2011/0131044 A1* | 6/2011 | Fukuda | G10L 15/20 704/246 |
| 2012/0020485 A1* | 1/2012 | Visser | H04R 3/005 381/57 |
| 2014/0163991 A1* | 6/2014 | Short | G10L 21/0272 704/258 |

FOREIGN PATENT DOCUMENTS

| | | |
|---|---|---|
| KR | 20060044008 | 5/2006 |
| KR | 100647826 | 11/2006 |
| KR | 20090081263 | 7/2009 |

\* cited by examiner

| value to be computed | proposed method | real-time FD ICA |
|---|---|---|
| $\mathbf{y}$ or $\mathbf{u}$ | $K(2M-1)$ | $KM^2$ |
| $\phi(Y(k,\tau))$ or $\phi(\mathbf{u}(k,\tau))$ | $2K$ | $2KM$ |
| $\xi$ | $K(M+2)$ | $K(M+2)$ |
| $\Delta\mathbf{w}$ or $\Delta\mathbf{W}$ | $2KM$ | $K(M^3+M^2-M)$ |
| MDP | $KM$ | $K(M+O(M^3)^*)$ |
| total | $K(6M+3)$ | $K(M^3+2M^2+3M+2+O(M^3))$ |

* the number of operations for matrix inversion

One interference and $RT_{60}$ of 0.2 s.

One interference and $RT_{60}$ of 0.4 s.

One interference and $RT_{60}$ of 0.6 s.

Two interferences and $RT_{60}$ of 0.2 s

Two interferences and $RT_{60}$ of 0.4 s.

Two interferences and $RT_{60}$ of 0.6 s.

Three interferences and $RT_{60}$ of 0.2 s.

Three interferences and $RT_{60}$ of 0.4 s.

Three interferences and $RT_{60}$ of 0.6 s.

Subway noise and $RT_{60}$ of 0.2 s.

Subway noise and $RT_{60}$ of 0.4 s.

Subway noise and $RT_{60}$ of 0.6 s.

Car noise and $RT_{60}$ of 0.2 s.

Car noise and $RT_{60}$ of 0.4 s.

Car noise and $RT_{60}$ of 0.6 s.

Exhibition hall noise and $RT_{60}$ of 0.2 s.

Exhibition hall noise and $RT_{60}$ of 0.4 s.

Exhibition hall noise and $RT_{60}$ of 0.6 s.

ONLINE TARGET-SPEECH EXTRACTION METHOD FOR ROBUST AUTOMATIC SPEECH RECOGNITION

BACKGROUND OF THE INVENTION

1. Field of the Invention

The present invention relates to a pre-processing method for target speech extraction in a speech recognition system or a speech recognition apparatus, and more particularly, a target speech extraction method capable of reducing a calculation amount and improving performance of speech recognition by performing independent component analysis by using information on a direction of arrival of a target speech source.

2. Description of the Prior Art

With respect to an automatic speech recognition (ASR) system, since much noise exists in real environments, noise robustness is very important to maintain. In many cases, degradation in performance of recognition of the speech recognition system are mainly caused from a difference between a learning environment and the real environment.

In general, in the speech recognition system, in a pre-processing step, a clear target speech signal which is a speech signal of a target speaker is extracted from input signals supplied through input means such as a plurality of microphones, and the speech recognition is performed by using the extracted target speech signal. In speech recognition systems, various types of pre-processing methods of extracting the target speech signal from the input signals are proposed.

In a speech recognition system using independent component analysis (ICA) of the related art, outputs signals as many as the input signals of which the number corresponds to the number of microphones are extracted, and one target speech signal is selected from the output signals In this case, in order to select the one target speech signal from the output signals of which the number corresponds to the number of input signals, a process of identifying which direction each of the output signals are input from is required, and thus, there are problems in that a calculation amount is overloaded and the entire performance is degraded due to error in estimation of the input direction.

In a blind spatial subtraction array (BSSA) method of the related art, after a target speech signal output is removed, a noise power spectrum estimated by ICA using a projection-back method is subtracted. In this BSSA method, since the target speech signal output of the ICA still includes noise and the estimation of the noise power spectrum cannot be perfect, there is a problem in that the performance of the speech recognition is degraded.

On the other hand, in a semi-blind source estimation (SBSE) method of the related art, some preliminary information such as direction information is used for a source signal or a mixing environment. In this method, known information is applied to generation of a separating matrix for estimation of the target signal, so that it is possible to more accurately separate the target speech signal. However, since this SBSE method requires additional transformation of input mixing vectors, there are problems in that the calculation amount is increased in comparison with other methods of the related art and the output cannot be correctly extracted in the case where preliminary information includes errors. On the other hand, in a real-time independent vector analysis (IVA) method of the related art, permutation problem across frequency bins in the ICA is overcome by using a statistic model considering correlation between frequencies. However, since one target speech signal needs to be selected from the output signals, problems exist in the ICA or the like.

SUMMARY OF THE INVENTION

The present invention is to provide a method of accurately extracting a target speech signal with a reduced calculation amount.

According to an aspect of the present invention, there is provided a target speech signal extraction method of extracting the target speech signal from the input signals input to at least two or more microphones, the target speech signal extraction method including: (a) receiving information on a direction of arrival of the target speech source with respect to the microphones; (b) generating a nullformer for removing the target speech signal from the input signals and estimating noise by using the information on the direction of arrival of the target speech source; (c) setting a real output of the target speech source using an adaptive vector w(k) as a first channel and setting a dummy output by the nullformer as a remaining channel; (d) setting a cost function for minimizing dependency between the real output of the target speech source and the dummy output using the nullformer by performing independent component analysis (ICA); and (e) estimating the target speech signal by using the cost function, thereby extracting the target speech signal from the input signals.

In the target speech signal extraction method according to the above aspect, preferably, the direction of arrival of the target speech source is a separation angle $\theta_{target}$, formed between a vertical line in a front direction of a microphone array and the target speech source.

In the target speech signal extraction method according to the above aspect, preferably, the nullformer is a "delay-subtract nullformer" and cancels out the target speech signal from the input signals input from the microphones.

In the target speech extraction method according to the present invention, in a speech recognition system, a target speech signal can be allowed to be extracted from input signals by using information of a target speech direction of arrival which can be supplied as preliminary information, and thus, the total calculation amount can be reduced in comparison with the extraction methods of the related art, so that a process time can be reduced.

In the target speech extraction method according to the present invention, a nullformer capable of removing a target speech signal from input signals and extracting only a noise signal is generated by using information of a direction of arrival of the target speech, and the nullformer is used for independent component analysis (ICA), so that the target speech signal can be more stably obtained in comparison with the extraction methods of the related art.

The present invention is to provide a non-transitory computer readable storage media having program instructions that, when executed by a processor of a speech recognition apparatus or a speech recognition system, cause the processor to perform the target speech signal extraction method according to the above-mentioned aspect of the present invention.

DETAILED DESCRIPTION OF THE INVENTION

The present invention relates to a target speech signal extraction method for robust speech recognition and a speech recognition pre-processing system employing the aforementioned target speech signal extraction method, and independent component analysis is performed in the assumption that a target speaker direction is known, so that a total calculation amount of speech recognition can be reduced and fast convergence can be performed.

Hereinafter, a pre-processing method for robust speech recognition according to an exemplary embodiment of the present invention will be described in detail with reference to the attached drawings.

The present invention relates to a pre-processing method of a speech recognition system for extracting a target speech signal of a target speech source that is a target speaker from input signals input to at least two or more microphones. The method includes receiving information on a direction of arrival of the target speech source with respect to the microphones; generating a nullformer by using the information on the direction of arrival of the target speech source to remove the target speech signal from the input signals and to estimate noise; setting a real output of the target speech source using an adaptive vector w(k) as a first channel and setting a dummy output by the nullformer as a remaining channel; setting a cost function for minimizing dependency between the real output of the target speech source and the dummy output using the nullformer by performing independent component analysis (ICA); and estimating the target speech signal by using the cost function, thereby extracting the target speech signal from the input signals.

In a target speech signal extraction method according to the exemplary embodiment of the present invention, a target speaker direction is received as preliminary information, and a target speech signal that is a speech signal of a target speaker is extracted from signals input to a plurality of (M) microphones by using the preliminary information.

Figure 1:
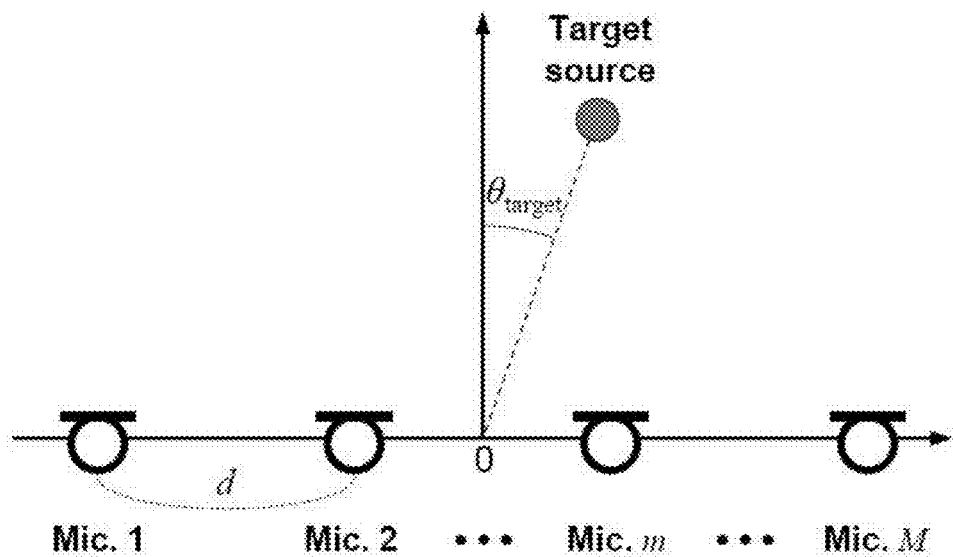
FIG. 1 is a configurational diagram illustrating a plurality of microphones and a target source in order to explain a target speech extraction method for robust speech recognition according to the present invention.

FIG. 1 is a configurational diagram illustrating a plurality of microphones and a target source in order to explain a target speech extraction method for robust speech recognition according to the present invention. Referring to FIG. 1, set are a plurality of the microphones Mic.1, Mic.2, . . . , and Mic.M and a target speech source that is a target speaker. A target speaker direction that is a direction of arrival of the target speech source is set as a separation angle $\theta_{target}$ between a vertical line in the front direction of a microphone array and the target speech source.

In FIG. 1, an input signal of an m-th microphone can be expressed by Mathematical Formula 1.

$$X_m(k, \tau) = [A(k)]_{m1}S_1(k, \tau) + \sum_{n=2}^{N} [A(k)]_{mn}S_n(k, \tau),$$ [Mathematical Formula 1]

Herein, k denotes a frequency bin number and τ denotes a frame number. $S_1(k,\tau)$ denotes a time-frequency segment of a target speech signal constituting the first channel, and $S_n(k,\tau)$ denotes a time-frequency segment of remaining signals excluding the target speech signal, that is, noise estimation signals. A(k) denotes a mixing matrix in a k-th frequency bin.

In a speech recognition system, the target speech source is usually located near the microphones, and acoustic paths between the speaker and the microphones have moderate reverberation components, which means that direct-path components are dominant. If the acoustic paths are approximated by the direct paths and relative signal attenuation among the microphones is negligible assuming proximity of the microphones without any obstacle, a relative ratio of target speech source components in a pair of microphone signals can be obtained by using Mathematical Formula 2.

$$\frac{[A(k)]_{m1}S_1(k, \tau)}{[A(k)]_{m'1}S_1(k, \tau)} \approx \exp\left\{j\omega_k \frac{d(m-m')\sin\theta_{target}}{c}\right\}$$ [Mathematical Formula 2]

Herein, $\theta_{target}$ denotes the direction of arrival (DOA) of the target speech source. Therefore, a "delay-and-subtract nullformer" that is a nullformer for canceling out the target speech signal from the first and m-th microphones can be expressed by Mathematical Formula 3.

$$U_m(k, \tau) = X_m(k, \tau) - \exp\left\{j\omega_k \frac{d(m-1)\sin\theta_{target}}{c}\right\}X_1(k, \tau),$$
$$m = 2, \ldots, M.$$ [Mathematical Formula 3]

The nullformer obtains the relative ratio of target speech signals by using the information on the direction of arrival of the target speech source, multiplies the relative ratio and an input signal of a microphone and subtracts the multiplied value from input signals of a pair of microphones so that the nullformer is configured for canceling out the target speech source component from the input signal of a microphone.

In order to derive a learning rule, the nullformer outputs are regarded as dummy outputs, and the real target speech output is expressed by Mathematical Formula 4.

$$Y(k,\tau) = w(k) \times (k,\tau)$$ [Mathematical Formula 4]

Herein, w(k) denotes the adaptive vector for generating the real output. Therefore, the real output and the dummy output can be expressed in a matrix form by Mathematical Formula 5.

$$y(k, \tau) = \begin{bmatrix} w(k) \\ -\gamma_k | I \end{bmatrix} x(k, \tau) \qquad \text{[Mathematical Formula 5]}$$

Herein, $y(k,\tau)=[Y(k,\tau),U_2(k,\tau), \ldots, U_M(k,\tau)]^T$, and $\gamma k=[\Gamma_k^1, \ldots, \Gamma_k^{M-1}]^T$, and $\Gamma_k=\exp\{j\omega_k d \sin \theta_{target}/c\}$.

Nullformer parameters for generating the dummy output are fixed to provide noise estimation. As a result, according to the present invention, permutation problem over the frequency bins can be solved. Unlike an IVA method, the estimation of w(k) at a frequency bin independent of other frequency bins can provide fast convergence, so that it is possible to improve performance of target speech signal extraction as pre-processing for the speech recognition system.

Therefore, according to the present invention, by maximizing independency between the real output and the dummy output at one frequency bin, it is possible to obtain a desired target speech signal from the real output.

With respect to the cost function, by Kullback-Leibler (KL) divergence between probability density functions p(Y(k,τ),U_2(k,τ), ..., U_M(k,τ)) and q(Y(k,τ)p(U_2(k,τ), ..., U_M(k,τ)), the terms independent of w(k) are removed, so that the cost function can be expressed by Mathematical Formula 6.

$$J' = -\log\left|\sum_{m=1}^{M} \Gamma_k^{m-1}[w(k)]_m\right| - E[\log q(Y(k, \tau))] \qquad \text{[Mathematical Formula 6]}$$

Herein, $[\cdot]_m$ denotes an m-th element of a vector.

Meanwhile, the cost function can be expressed as a probability density function of various speech sources in the frequency domain by modeling the probability density function following the Generalized Gaussian distribution expressed by Mathematical Formula 7.

$$p(Y(k, \tau)) \propto \frac{1}{\lambda(k, \tau)} \exp\left\{-\left(\frac{|Y(k, \tau)|^2}{\lambda(k, \tau)}\right)^\beta\right\} \qquad \text{[Mathematical Formula 7]}$$

Herein, $\lambda(k,\tau)$ and $\beta$ are variance and shape parameter, respectively, and the type of pdf can be determined according to the value of these parameters. For example, if the pdf is a Laplace distribution with a unit variance, $\beta=\frac{1}{2}$ and $\lambda(k,\tau)=1$ and if the pdf is a Gaussian distribution, then $\beta=1$.

In order to minimize the cost function, natural-gradient algorithm can be expressed by Mathematical Formula 8.

$$\Delta w(k) \propto \{[1, 0, \ldots, 0] - E[\phi(Y(k, \tau))y^H(k, \tau)]\} \qquad \text{[Mathematical Formula 8]}$$

$$\begin{bmatrix} w(k) \\ -\gamma_k | I \end{bmatrix}$$

Herein, $\phi(Y(k,\tau))$ can be expressed by Mathematical Formula 9.

$$\phi(Y(k, \tau)) = -\log q(Y(k, \tau))/dY(k, \tau) = \qquad \text{[Mathematical Formula 9]}$$
$$\frac{2\beta}{\lambda^\beta(k, \tau)} |Y(k, \tau)|^{2(\beta-1)} Y(k, \tau)$$

Further, assuming that $\lambda(k,\tau)$ is a variable variance that varies with time, various methods can be proposed to estimate $\lambda(k,\tau)$. For example, we can estimate using $\lambda(k,\tau)= \beta^{1/\beta}|Y(k,\tau)|^2$, using likelihood maximization. In case of the Laplace distribution with $\beta=\frac{1}{2}$, $\lambda(k,\tau)=|Y(k,\tau)|^2/4$, and in case of the Gaussian distribution with $\beta=1$, $\lambda(k,\tau)=|Y(k,\tau)|^2$.

Further, the value of $\lambda(k,\tau)$ may be estimated with a formula of $$\lambda(k, \tau) = \frac{\beta^{1/\beta}}{2N_a + 1} \sum_{\tau'=\tau-N_a}^{\tau+N_a} |Y(k, \tau')|^2$$

including $N_\alpha$ frames before and after the current time frame T considering the values of adjacent time frames. Similarly, the value of $\lambda(k,\tau)$ can also be estimated by a recursive formula of $\lambda(k,\tau)=\gamma|Y(k,\tau)|^2+(1-\gamma)\lambda(k,\tau-1)$, where $\gamma$ is a smoothing parameter. Therefore, $\lambda(k,\tau)$ and w(k) are updated and converged alternatively and repeatedly. Also, since $Y(k,\tau)=x(k)\times(k,\tau)$ as shown in the Mathematical formula 4, $\lambda(k,\tau)$ can be initialized by various methods including the above-described method through the initial value of w(k). When the initial value of $\lambda(k,\tau)$ is a unit vector with m-th element of 1, the initial value of can be calculated by the power of the individual microphone input signals. Alternatively, the value of $\lambda(k,\tau)$ maybe calculated with roughly improved signal power through the beamformer using the DOA.

Therefore, an online natural-gradient algorithm is applied with a nonholonomic constraint and normalization by a smoothed power estimate, so that the algorithm can be corrected as Mathematical Formula 10.

$$\Delta w(k) \propto \frac{1}{\sqrt{\xi(k, \tau)}} \{[\phi(Y(k, \tau))Y^*(k, \tau), \qquad \text{[Mathematical Formula 10]}$$
$$0, \ldots, 0] - \Delta w(k) \propto \phi(Y(k, \tau))$$
$$y^H(k, \tau)\begin{bmatrix} w(k) \\ -\gamma_k | I \end{bmatrix}$$
$$= -\frac{\phi(Y(k, \tau))}{\sqrt{\xi(k, \tau)}} [U_2^*(k, \tau), \ldots, U_M^*$$
$$(k, \tau)][-\gamma_k | I]$$
$$= \frac{\phi(Y(k, \tau))}{\sqrt{\xi(k, \tau)}} \left[\sum_{m=2}^{M} \Gamma_k^{m-1}(k, \tau), -U_2^*\right.$$
$$\left.(k, \tau), \ldots, -U_M^*(k, \tau)\right]$$

In order to resolve scaling indeterminacy of the output signal by applying a minimal distortion principle (MDP) to the obtained output $Y(k,\tau)$, the diagonal elements of an inverse matrix of a separating matrix needs to be obtained.

Due to the structural features, the inverse matrix $$\begin{bmatrix} w(k) \\ -\gamma_k | I \end{bmatrix}^{-1}$$

of the above-described matrix can be simply obtained by calculating only a factor for $1/\Sigma_{m=1}^{M}\Gamma_k^{m-1}[w(k)]_m$ for the target output and multiplying the factor to the output.

Next, a time domain waveform of the estimated target speech signal can be reconstructed by Mathematical Formula 11.

$$y(t) = \sum_{\tau} \sum_{k=1}^{K} Y(\tau, k) e^{j\omega_k(t-\tau H)} \qquad \text{[Mathematical Formula 11]}$$

Figure 2:
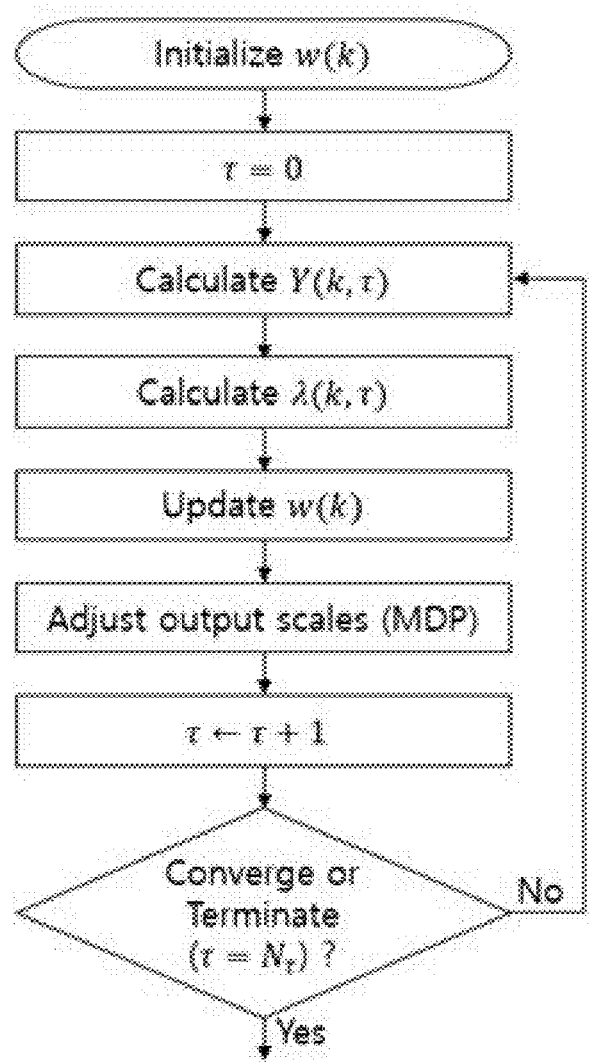
FIG. 2 is a flowchart sequentially illustrating an algorithm according to a target speech extraction method for robust speech recognition according to the present invention.

FIG. 2 is a flowchart sequentially illustrating an algorithm according to the present invention.

Figures 3, 4:
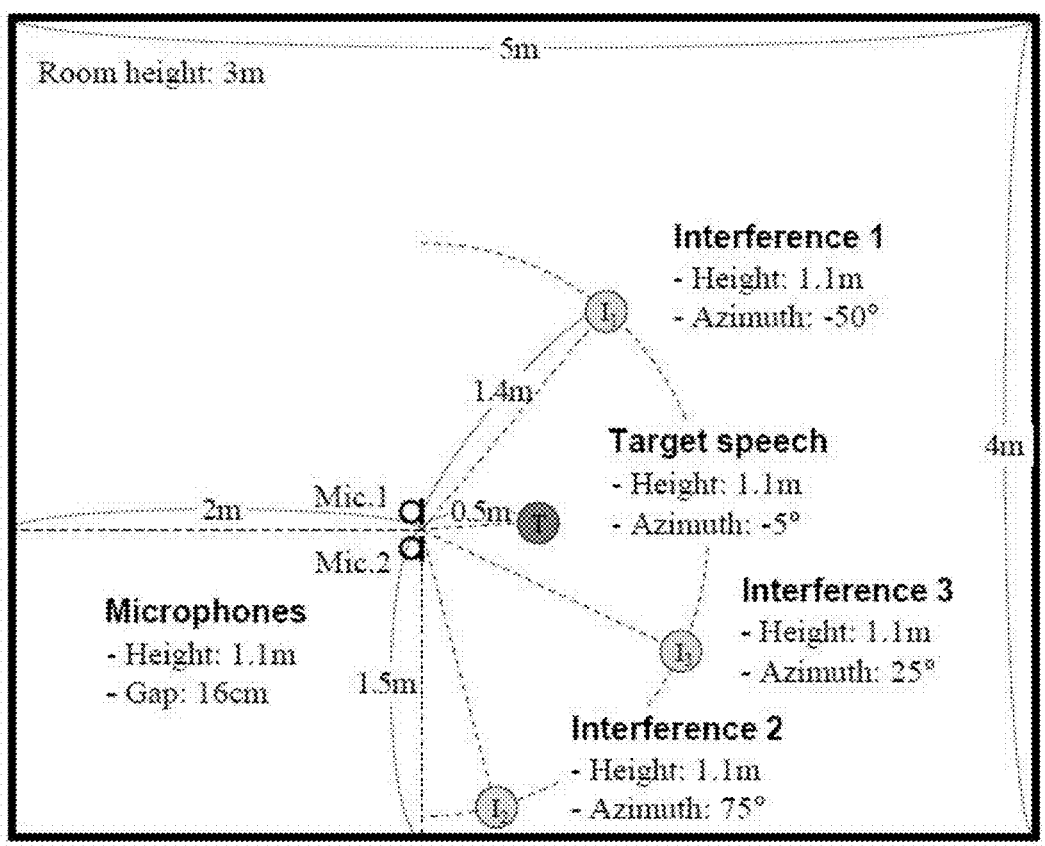
FIG. 3 is a table illustrating comparison of calculation amounts required for processing one data frame between a method according to the present invention and a real-time FD ICA method of the related art.
FIG. 4 is a configurational diagram illustrating a simulation environment configured in order to compare performance between the method according to the present invention and methods of the related art.

FIG. 3 is a table illustrating comparison of calculation amounts required for calculating values of the first column of one data frame between a method according to the present invention and a real-time FD ICA method of the related art.

In FIG. 3, M denotes the number of input signals as the number of microphones. K denotes frequency resolution as the number of frequency bins. O(M) and O(M³) denotes a calculation amount with respect to a matrix inverse transformation. It can be understood from FIG. 3 that the method of the related art requires more additional computations than the method according to the present invention in order to resolve the permutation problem and to identify the target speech output.

FIG. 4 is a configurational diagram illustrating a simulation environment configured in order to compare performance between the method according to the present invention and methods of the related art. Referring to FIG. 4, there is a room having a size of 3 m×4 m where two microphones Mic.1 and Mic.2 and a target speech source T are provided and three interference speech sources Interference 1, Interference 2, and Interference 3 are provided.

Figure 5A:
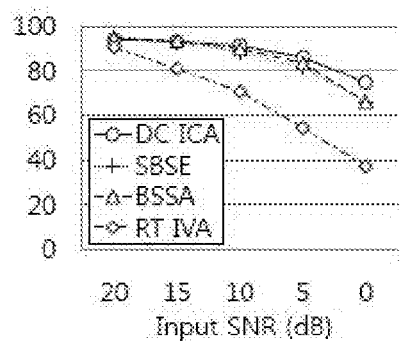
FIGS. 5A to 5I are graphs illustrating results of simulation of the method according to the present invention (referred to as 'DC ICA'), a first method of the related art (referred to as 'SBSE'), a second method of the related art (referred to as 'BSSA', and a third method of the related art (referred to as 'RT IVA') while adjusting the number of interference speech sources under the simulation environment of FIG. 4.
Figure 5B:
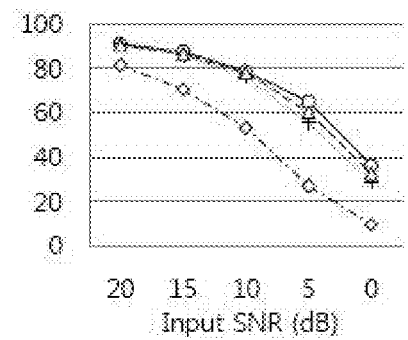
Figure 5C:
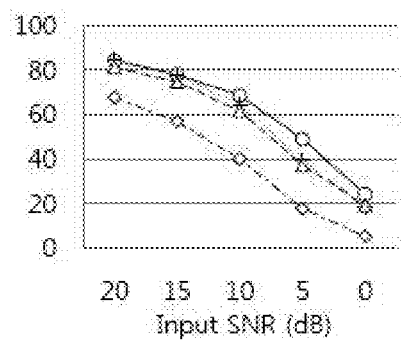
Figure 5D:
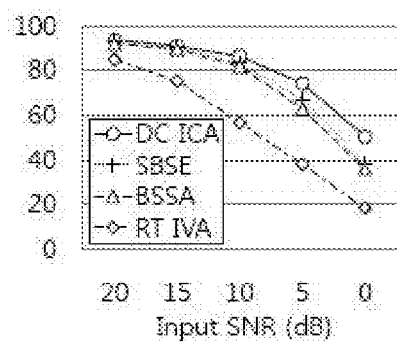
Figure 5E:
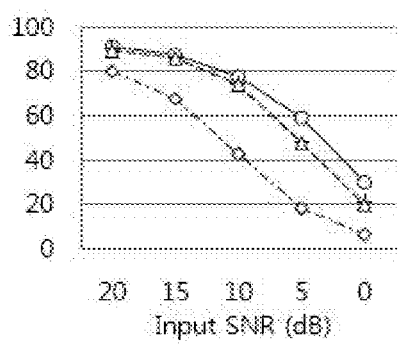
Figure 5F:
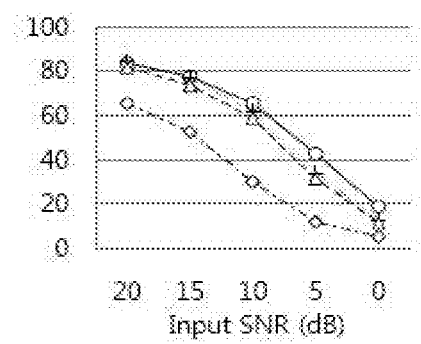
Figure 5G:
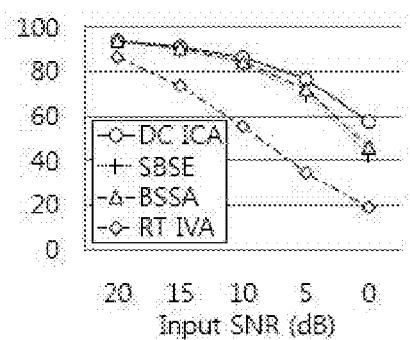
Figure 5H:
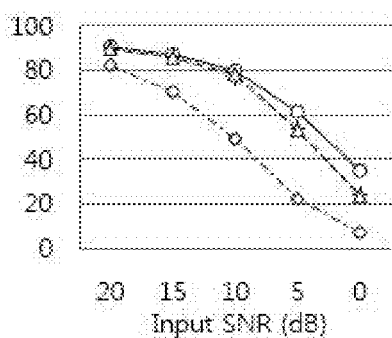
Figure 5I:
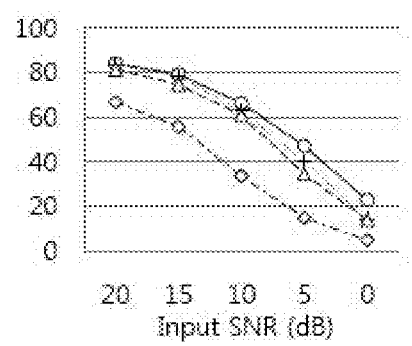

FIGS. 5A to 5I are graphs of results of simulation of the method according to the present invention (referred to as 'DC ICA'), a first method of the related art (referred to as 'SBSE'), a second method of the related art (referred to as 'BSSA', and a third method of the related art (referred to as 'RT IVA') while adjusting the number of interference speech sources under the simulation environment of FIG. 4. FIG. 5A illustrates a case where there is one interference speech source Interference 1 and $RT_{60}$=0 0.2 s. FIG. 5b illustrates a case where there is one interference speech source Interference 1 and $RT_{60}$=0.4 s. FIG. 5C illustrates a case where there is one interference speech source Interference 1 and $RT_{60}$=0.6 s. FIG. 5D illustrates a case where there are two interference speech sources Interference 1 and Interference 2 and $RT_{60}$=0.2 s. FIG. 5E illustrates a case where there are two interference speech sources (Interference 1 and Interference 2 and $RT_{60}$=0.4 s. FIG. 5F illustrates a case where there are two interference speech sources (Interference 1 and Interference 2 and $RT_{60}$=0.6 s. FIG. 5G illustrates a case where three are two interference speech sources Interference 1, Interference 2, and Interference 3 and $RT_{60}$=0.2 s. FIG. 5H illustrates a case where three are two interference speech sources Interference 1, Interference 2, and Interference 3 and $RT_{60}$=0.4 s. FIG. 5I illustrates a case where three are two interference speech sources Interference 1, Interference 2, and Interference 3 and $RT_{60}$=0.6 s. In each graph, the horizontal axis denotes an input SNR (dB), and the vertical axis denotes word accuracy (%).

It can be easily understood from FIGS. 5A to 5I that the accuracy of the method according to the present invention is higher than those of the methods of the related art.

Figure 6A:
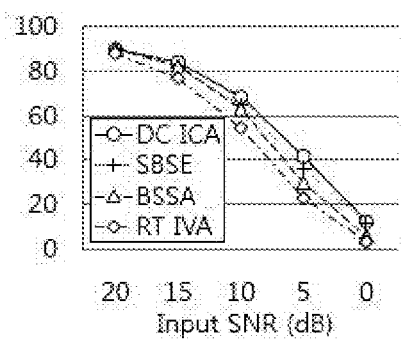
FIGS. 6A to 6I are graphs of results of simulation the method according to the present invention (referred to as 'DC ICA'), the first method of the related art (referred to as 'SBSE'), a second method of the related art (referred to as 'BSSA'), and a third method of the related art (referred to as 'RT IVA') by using various types of noise samples under the simulation environment of FIG. 4.
Figure 6B:
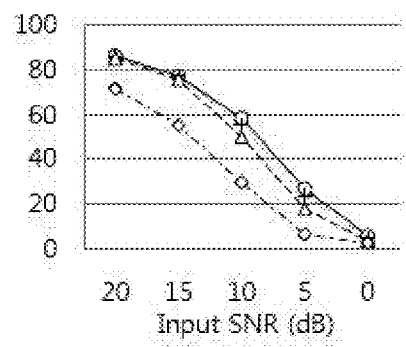
Figure 6C:
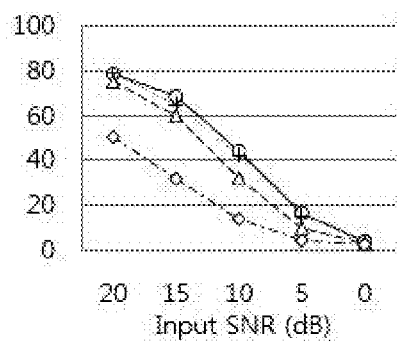
Figure 6D:
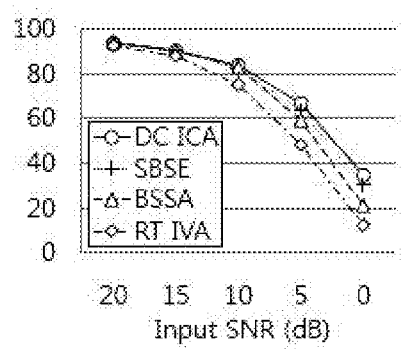
Figure 6E:
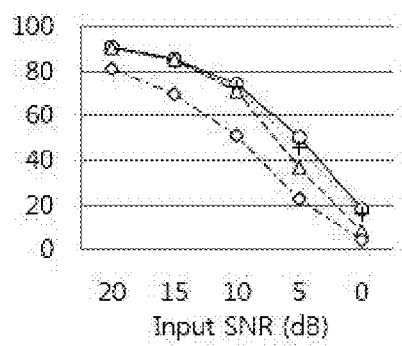
Figure 6F:
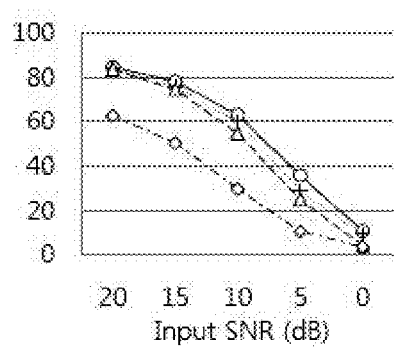
Figure 6G:
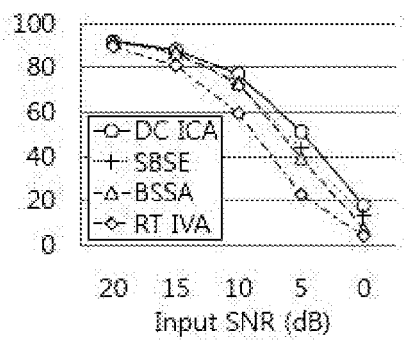
Figure 6H:
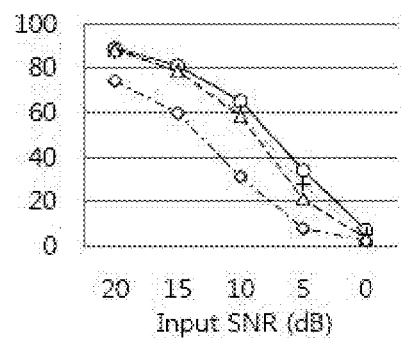
Figure 6I:
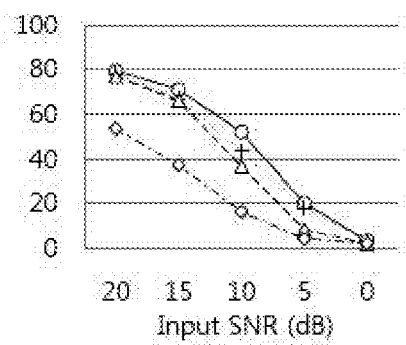

FIGS. 6A to 6I are graphs of results of simulation the method according to the present invention (referred to as 'DC ICA'), the first method of the related art (referred to as 'SBSE'), a second method of the related art (referred to as 'BSSA'), and a third method of the related art (referred to as 'RT IVA') by using various types of noise samples under the simulation environment of FIG. 4. FIG. 6A illustrates a case of subway noise and R $T_{60}$=0.2 s. FIG. 6B illustrates a case of subway noise and R $T_{60}$=0.4 s. FIG. 6C illustrates a case of subway noise and R $T_{60}$=0.6 s. FIG. 6D illustrates a case of car noise and R $T_{60}$=0.2 s. FIG. 6E illustrates a case of car noise and R $T_{60}$=0.4 s. FIG. 6F illustrates a case of car noise and R $T_{60}$=0.6 s. FIG. 6G illustrates a case of exhibition hall noise and R $T_{60}$=0.2 s. FIG. 6H illustrates a case of exhibition hall noise and R $T_{60}$=0.4 s. FIG. 6I illustrates a case of exhibition hall noise and R $T_{60}$=0.6 s. In each graph, the horizontal axis denotes an input SNR (dB), and the vertical axis denotes word accuracy (o).

It can be easily understood from FIGS. 6A to 6I that the accuracy of the method according to the present invention is higher than those of the methods of the related art with respect to all kinds of noise.

While the present invention has been particularly shown and described with reference to exemplary embodiments thereof, it will be understood by those skilled in the art that various changes in form and details may be made therein without departing from the spirit and scope of the present invention as defined by the appended claims.

A target speech signal extraction method according to the present invention can be used as a pre-processing method of a speech recognition system.

What is claimed is:

1. A target speech signal extraction method of extracting a target speech signal from input signals input to at least two or more microphones for robust speech recognition, by a processor of a speech recognition apparatus, comprising:
   (a) receiving information on a direction of arrival of the target speech source with respect to the microphones;
   (b) generating a nullformer for removing the target speech signal from the input signals and estimating noise by using the information on the direction of arrival of the target speech source;
   (c) setting a real output of the target speech source using an adaptive vector w(k) as a first channel and setting a dummy output by the nullformer as a remaining channel;
   (d) setting a cost function for minimizing dependency between the real output of the target speech source and the dummy output using the nullformer by performing independent component analysis (ICA); and
   (e) estimating the target speech signal by using the cost function, thereby extracting the target speech signal from the input signals,
   wherein the direction of arrival of the target speech source is a separation angle $\theta_{target}$ formed between a vertical line in the microphone and the target speech source, and
   wherein the nullformer for generating the dummy output is obtained by using the separation angle $\theta_{target}$ and is fixed to provide noise estimation.

2. The target speech signal extraction method according to claim 1, wherein the nullformer is a "delay-subtract nullformer", and
   wherein the (b) for generating the nullformer includes of obtaining a relative ratio of target speech signals by using the information on the direction of arrival (DOA) of the target speech source, multiplying the relative ratio and an input signal of a microphone and subtracting the multiplied value from input signals of a pair of microphones to cancel out the target speech source component from the input signal of a microphone.

3. The target speech signal extraction method according to claim 1,
   wherein a probability density function of the cost function is modeling by a generalized Gaussian distribution.

4. The target speech signal extraction method according to claim 3,
   wherein the generalized gaussian distribution has a varying variance with regard to time-frequency or one of time and frequency, and
   wherein the (e) for estimating the target speech signal includes of updating the varying variance λ and the adaptive vector w(k) alternately, and estimating the target speech signal by using the updated varying variance and the adaptive vector.

5. The target speech signal extraction method according to claim 3,
wherein the generalized gaussian distribution has a constant variance, and
wherein the (e) for estimating the target speech signal includes of learning the cost function to update the adaptive vector w(k), and estimating the target speech signal by using the updated adaptive vector.

6. The target speech signal extraction method according to claim 3, the target speech signal extraction method further comprises (f) applying a minimal distortion principle (MDP) using a target speech element of a diagonal elements in an inverse matrix of a separating matrix, to the estimated the target speech signal.

7. A non-transitory computer readable storage media having program instructions that, when executed by a processor of a speech recognition apparatus, cause the processor to perform the target speech signal extraction method according to claim 1.

8. The target speech signal extraction method according to claim 1,
wherein a time domain waveform y(k) of an estimated target speech signal is expressed by the following Mathematical Formula, and $$y(t) = \sum_\tau \sum_{k=1}^{K} Y(\tau, k) e^{j\omega_k(t-\tau H)}$$

wherein $Y(k,\tau) = w(k)x(k,\tau)$, w(k) denotes an adaptive vector for generating a real output with respect to the target speech source, and k and τ denote a frequency bin number and a frame number, respectively.

* * * * *